US010320134B2

(12) United States Patent
Blackburn

(10) Patent No.: US 10,320,134 B2
(45) Date of Patent: Jun. 11, 2019

(54) CONNECTOR BRICK FOR A CABLE COMMUNICATION SYSTEM

(71) Applicant: TE CONNECTIVITY CORPORATION, Berwyn, PA (US)

(72) Inventor: Christopher William Blackburn, Harrisburg, PA (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 7 days.

(21) Appl. No.: 15/713,804

(22) Filed: Sep. 25, 2017

(65) Prior Publication Data

US 2019/0097371 A1 Mar. 28, 2019

(51) Int. Cl.

| | |
|---|---|
| ***H01R 27/02*** | (2006.01) |
| ***H01R 25/00*** | (2006.01) |
| ***H01R 13/6587*** | (2011.01) |
| ***H01R 13/629*** | (2006.01) |
| ***H04Q 1/14*** | (2006.01) |
| ***H04Q 1/02*** | (2006.01) |

(52) U.S. Cl.

CPC ........... *H01R 27/02* (2013.01); *H01R 13/629* (2013.01); *H01R 13/6587* (2013.01); *H01R 25/003* (2013.01); *H04Q 1/141* (2013.01); *H04Q 1/15* (2013.01)

(58) Field of Classification Search

CPC .. H01R 12/91; H01R 13/629; H01R 13/6315; H01R 13/6587; H01R 25/003; H01R 27/02; H01R 25/00; H04Q 1/141; H04Q 1/15; H05K 7/1492

USPC ...................................... 174/17 R; 439/540.1

See application file for complete search history.

(56) References Cited

U.S. PATENT DOCUMENTS

| | | | | |
|---|---|---|---|---|
| 9,155,214 | B2 | 10/2015 | Ritter et al. | |
| 9,439,319 | B2 * | 9/2016 | Rossman | H02G 3/18 |
| 2016/0149362 | A1 * | 5/2016 | Ritter | H04Q 1/15<br>439/540.1 |
| 2016/0276790 | A1 | 9/2016 | Simpson et al. | |

* cited by examiner

*Primary Examiner* — Timothy J Thompson
*Assistant Examiner* — Guillermo J Egoavil

(57) ABSTRACT

A connector brick for a cable communication system includes a connector frame including brick plates defining a frame space and cable connectors received in the frame space. The connector brick includes cable connector mounts coupled to the brick plates and extending across the frame space. The cable connector mounts sub-divide the frame space into cable connector openings receiving corresponding cable connectors. Each cable connector mount includes a brick spacer coupled to the brick plates and engaging corresponding cable connectors to secure the cable connectors in the frame space. Each cable connector mount includes a retainer clip snapably coupled to the brick spacer to secure the brick spacer to the brick plates.

20 Claims, 9 Drawing Sheets

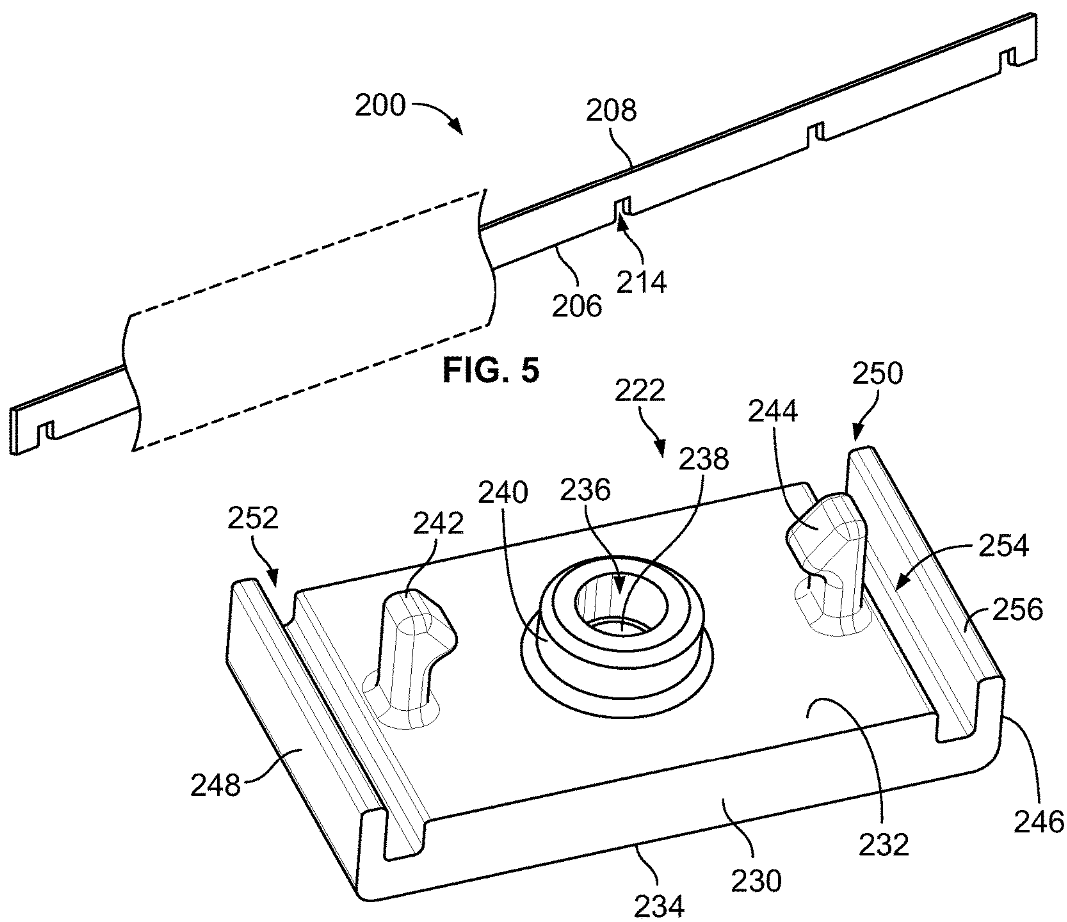
FIG. 5
FIG. 6
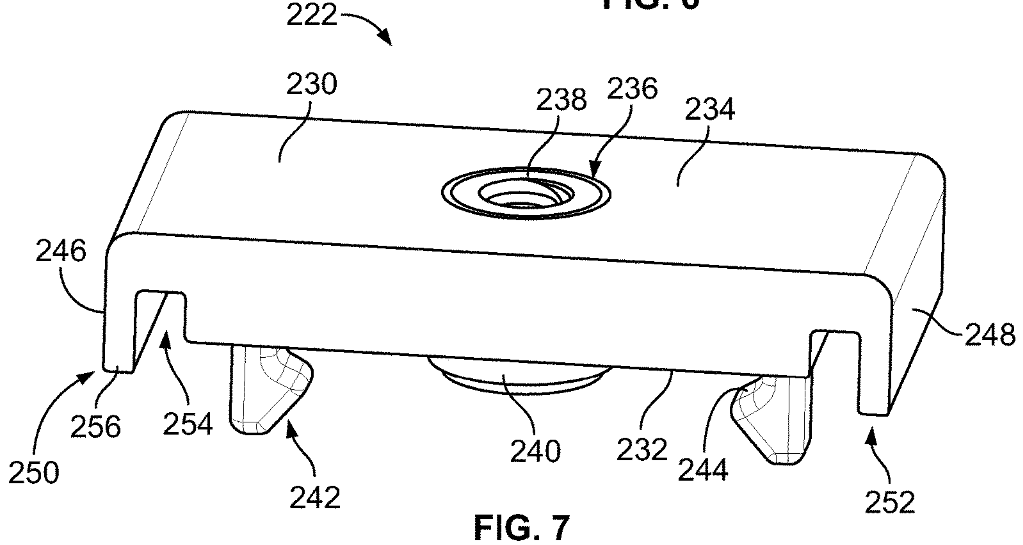
FIG. 7

CONNECTOR BRICK FOR A CABLE COMMUNICATION SYSTEM

BACKGROUND OF THE INVENTION

The subject matter herein relates generally to connector bricks for a cable communication system.

Communication systems, such as network systems, servers, data centers, and the like, use large printed circuit boards, known as backplanes or midplanes, to interconnect circuit cards, such as daughtercards, line cards and/or switch cards. The communication systems use high speed differential connectors mounted to the backplane and high speed differential connectors mounted to the line cards and switch cards to transmit signals therebetween. The backplane interconnects the various connectors using traces along the circuit board.

As the density of the systems increase and requirements for high speed lines increase, the printed circuit boards continue to become larger and the signal integrity inherently degrades as the signals travel further along the entire channel. At least some systems have replaced the traditional backplanes with cable assemblies. The cable assemblies need to be held in predetermined locations for mating with line and switch cards. Some known cable communication systems use a cable rack to hold all of the cables and cable connectors of the cable assemblies and a backplane circuit board to precisely locate the cable connectors, guide features and other components for mating with the line and switch cards. However, due to the large number of cable connectors and associated cables, assembly of the cable communication systems is often difficult. For example, cable management of the numerous cables during assembly is difficult. Additionally, securing the cable connectors in the structure of the cable communication system is problematic and time consuming. Securing the cable connectors in the structure typically requires many components and fasteners to assemble the system.

A need remains for a cable communication system that may be assembled in an easy and timely manner.

BRIEF DESCRIPTION OF THE INVENTION

In one embodiment, a connector brick for a cable communication system is provided including a connector frame including first and second brick plates defining a frame space and cable connectors received in the frame space each having cables extending therefrom and a header holding signal contacts at a mating end of the header and configured for mating with a corresponding card connector of a circuit card. The connector brick includes cable connector mounts coupled to the first and second brick plates and extending across the frame space. The cable connector mounts subdivide the frame space into cable connector openings receiving corresponding cable connectors. Each cable connector mount includes a brick spacer coupled to the first brick plate and the second brick plate and engaging corresponding cable connectors to secure the cable connectors in the frame space. Each cable connector mount includes a retainer clip snapably coupled to the brick spacer to secure the brick spacer to the first brick plate and to the second brick plate.

In another embodiment, a connector brick for a cable communication system is provided including a connector frame including first and second brick plates defining a frame space and cable connectors received in the frame space each having cables extending therefrom and a header holding signal contacts at a mating end of the header and configured for mating with a corresponding card connector of a circuit card. The connector brick includes cable connector mounts coupled to the first and second brick plates and extending across the frame space. The cable connector mounts sub-divide the frame space into cable connector openings receiving corresponding cable connectors. Each cable connector mount includes a brick spacer having first and second spacer brackets coupled to the first and second brick plates, respectively. Each cable connector mount including a retainer clip having first and second clip brackets coupled to the first and second brick plates, respectively. The first brick plate is captured between the corresponding first spacer brackets and the first clip brackets and the second brick plate is captured between the corresponding second spacer brackets and the second clip brackets. The brick spacers engage corresponding cable connectors to secure the cable connectors in the frame space. The retainer clips are securely coupled to the corresponding brick plates.

In a further embodiment, a cable communication system is provided including a chassis having a frame having a plurality of frame members and connector bricks coupled to the frame. Each connector brick includes a connector frame including first and second brick plates defining a frame space and cable connectors received in the frame space each having cables extending therefrom and a header holding signal contacts at a mating end of the header and configured for mating with a corresponding card connector of a circuit card. The connector brick includes cable connector mounts coupled to the first and second brick plates and extending across the frame space. The cable connector mounts subdivide the frame space into cable connector openings receiving corresponding cable connectors. Each cable connector mount includes a brick spacer coupled to the first brick plate and the second brick plate and engaging corresponding cable connectors to secure the cable connectors in the frame space. Each cable connector mount includes a retainer clip snapably coupled to the brick spacer to secure the brick spacer to the first brick plate and to the second brick plate.

BRIEF DESCRIPTION OF THE DRAWINGS

FIG. 5 is a perspective view of a brick plate of the connector brick in accordance with an exemplary embodiment.

FIG. 6 is a front perspective view of a retainer clip of the connector brick in accordance with an exemplary embodiment.

FIG. 7 is a rear perspective view of the retainer clip.

DETAILED DESCRIPTION OF THE INVENTION

Figure 1:
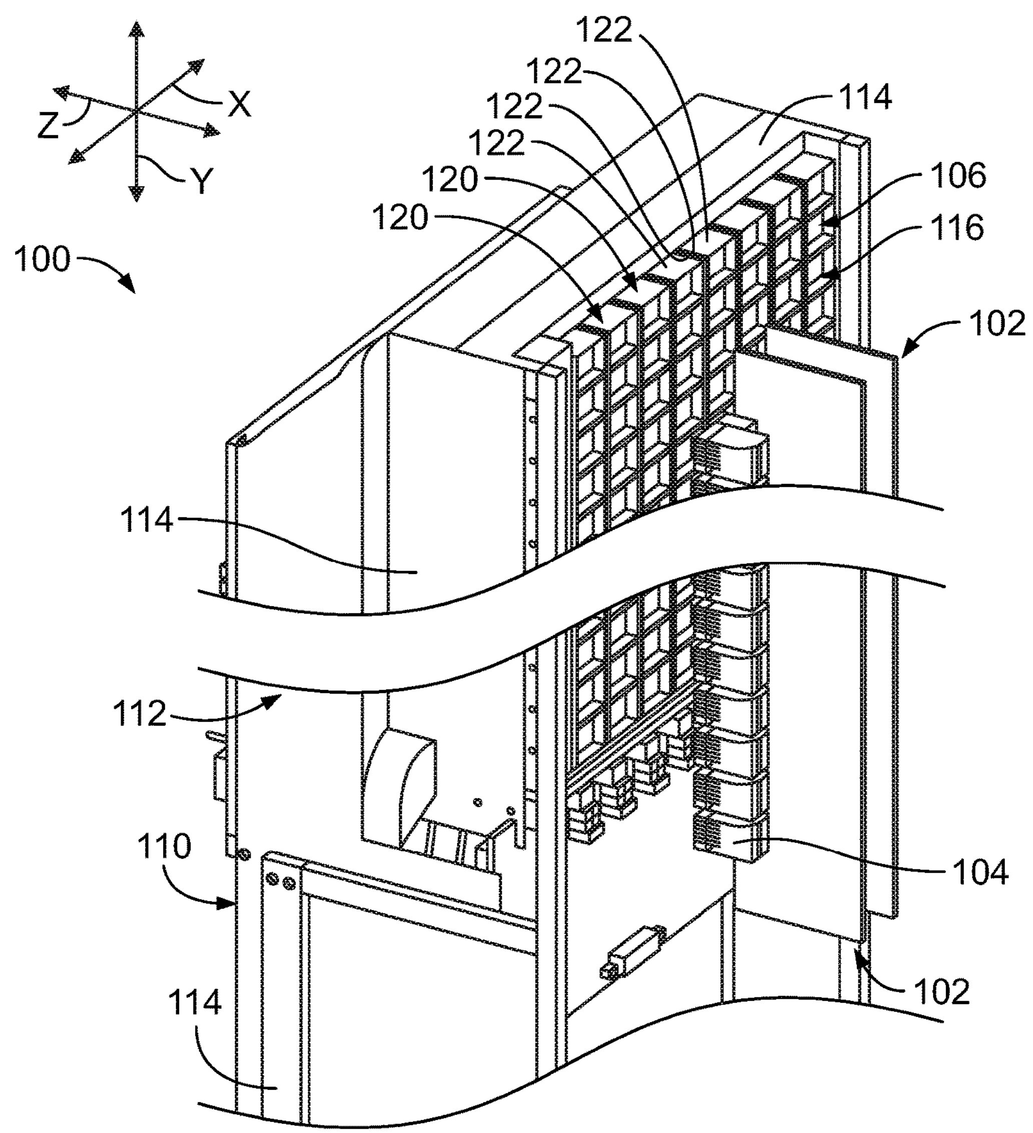
FIG. 1 is a front perspective view of a cable communication system formed in accordance with an exemplary embodiment.

FIG. 1 is a front perspective view of a cable communication system 100 formed in accordance with an exemplary embodiment. The cable communication system 100 is used in a data communication application, such as a network switch. The cable communication system 100 interconnects with circuit cards 102, such as daughtercards, line cards, switch cards, and the like, having card connectors 104. In other embodiments, the cable communication system 100 interconnects with connector or connector assemblies that are cable connectors rather than board mounted connectors. The cable communication system 100 includes a plurality of cable connector assemblies 106 to interconnect the circuit cards 102. The cable communication system 100 may be used to interconnect with other types of connectors and/or cards in other embodiments. The cable communication system 100 may be a backplane system, a midplane system, or another type of communication system.

The cable connector assemblies 106 include cable connectors 116 that are interconnected by cables within the cable communication system 100. The cable connector assemblies 106 eliminate interconnections via traces of a circuit board, such as a backplane circuit board, a midplane circuit board, and the like. The cable connector assemblies 106 have improved signal performance along the signal paths between various connectors of the cable communication system 100 as compared to conventional communication systems. The cable connector assemblies 106 support higher speeds and longer signal path lengths as compared to conventional backplanes or midplanes. The cable connector assemblies 106 provide shielding of signal lines for improved signal performance. The cable connector assemblies 106 are packaged in a structure that allows accurate cable and connector location for mating with the corresponding circuit cards 102. The structure manages and organizes the many cables interconnecting the cable connectors 116. In an exemplary embodiment, the structure is designed for convenient loading of the cable connectors 116 therein using configurable mounting features to secure the cable connectors 116. As such, the cable connectors 116 may be loaded into the structure in any convenient order.

The cable communication system 100 includes a chassis 110 that supports the components of the cable communication system 100. The chassis 110 may include a rack, a cabinet or other suitable structures for holding the components of the cable communication system 100. The chassis 110 may include structures for guiding, supporting and/or securing the circuit cards 102 coupled to the cable communication system 100.

The chassis 110 includes a frame 112 that supports the cable connector assemblies 106 and/or manages the cables of the cable connector assemblies 106. The frame 112 includes a plurality of frame members 114. The frame members 114 may define an open-air cable communication system 100 where the cables are exposed to the external environment. For example, the frame members 114 may be metal support beams or bars forming a rack. In other various embodiments, the frame members 114 may define an enclosed cable communication system 100 where the cables are enclosed in cable channels or raceways. For example, the frame members 114 may include sheet metal pieces forming cable trays to contain the cables. Other types of frame members 114 may be used in various embodiments.

The chassis 110 may include organizer boards or plates coupled to the front and/or rear of the frame 112. The organizer boards may include openings through which one or more of the cable connectors 116 may extend for mating with the circuit cards 102. Optionally, the organizer board may be a circuit board and may be manufactured from typical circuit board material, such as FR-4 material. For example, the organizer board may be a backplane circuit board, a midplane circuit board, and the like. Electrical components, such as power supplies, fans, fixed connectors, and the like may be mechanically and/or electrically connected to the circuit board. Additionally, components on the organizer board may align, mate or otherwise couple to components on the circuit cards 102. Alternatively, the organizer board may be a sheet metal plate having one or more openings. In other various embodiments, the chassis 110 may be provided without an organizer board.

In an exemplary embodiment, the cable connectors 116 are arranged together in groups to form one or more connector bricks 120. The connector bricks 120 are coupled to the frame 112. In various embodiments, the connector bricks 120 may be pre-populated with the cable connectors 116 and then coupled to the frame 112 as a unit. In other embodiments, the supporting frame or structure of the connector bricks 120 may be coupled to the chassis 110 prior to loading the cable connectors 116 therein. The connector bricks 120 may include mounting features that allow the cable connectors 116 to be mounted in place and may allow mounting the cable connectors 116 in any convenient order during assembly.

The connector bricks 120 may be oriented vertically, horizontally or at other orientations or combination of orientations. Each connector brick 120 may be independently movable relative to other connector bricks 120, such as for alignment and mating with the corresponding circuit card 102. Optionally, each connector brick 120 is mated to a different circuit card 102, such as when both the connector bricks 120 and the circuit cards 102 are oriented horizontally. Alternatively, each connector brick 120 may be mated to a plurality of different circuit cards 102, such as when the connector bricks 120 are oriented horizontally and the circuit cards 102 are oriented vertically.

Each connector brick 120 includes a connector frame 122 that holds and supports a plurality of the cable connectors 116. The cables connecting various cable connectors 116 are routed between cable connectors 116 held in different connector bricks 120. Optionally, cables from one cable connector 116 may be routed to different cable connectors 116 held in different connector bricks 120. To ease assembly and routing of the cables between the different cable connectors 116 and different connector bricks 120, the connector frames 122 may include mounting features that allow the cable connectors 116 to be mounted to the connector frames 122 in any convenient order, such as starting loading of some connector bricks 120 in the middle of the connector bricks 120, starting loading of some connector bricks 120 near one end of the connector bricks 120, starting loading of some connector bricks 120 near the other end of the connector bricks 120, and the like. Optionally, the connector bricks 120 may be connected to the frame members 114 with some freedom of movement or float in the connection to allow the connector bricks 120 to move relative to one another to independently align the connector bricks 120 relative to the frame 112 and/or the organizer boards and/or the associated circuit cards 102. In various embodiments, the connector frame 122 may be connected to the frame members 114 using float mechanisms.

Optionally, the frame 112 may hold the connector bricks 120 in rough alignment for mating with the circuit cards 102. The connector bricks 120 may have a limited amount of float relative to the frame 112 to allow course alignment of the connector brick 120 with the circuit card 102 during mating. For example, the float mechanisms may allow a limited amount of movement or float in mutually perpendicular X, Y and/or Z directions to allow course alignment of the connector brick 120 with the circuit card 102. Guide features may be provided on the connector brick 120 and on the circuit card 102 that guide mating of the circuit card 102 with the connector brick 120. The cable connectors 116 are moved with the connector frame 122 during course alignment and mating with the circuit card 102 such that the cable connectors 116 are positioned within a tolerance for mating with corresponding card connectors 104 of the circuit card 102.

Optionally, each cable connector 116 may have a limited amount of floating movement relative to the corresponding connector frame 122 to allow for precise positioning or fine alignment of the cable connector 116 for mating with the corresponding card connector 104. For example, the connection or mounting element between the cable connector 116 and the connector frame 122 may allow a limited amount of movement or float in mutually perpendicular X, Y and/or Z directions to allow fine alignment of the cable connector 116 with the corresponding card connector 104 of the circuit card 102. As such, the cable connectors 116 do not need to be precisely positioned prior to mating as the connector brick 120 will provide course alignment and the cable connectors 116 themselves will provide fine alignment during mating.

Figure 2:
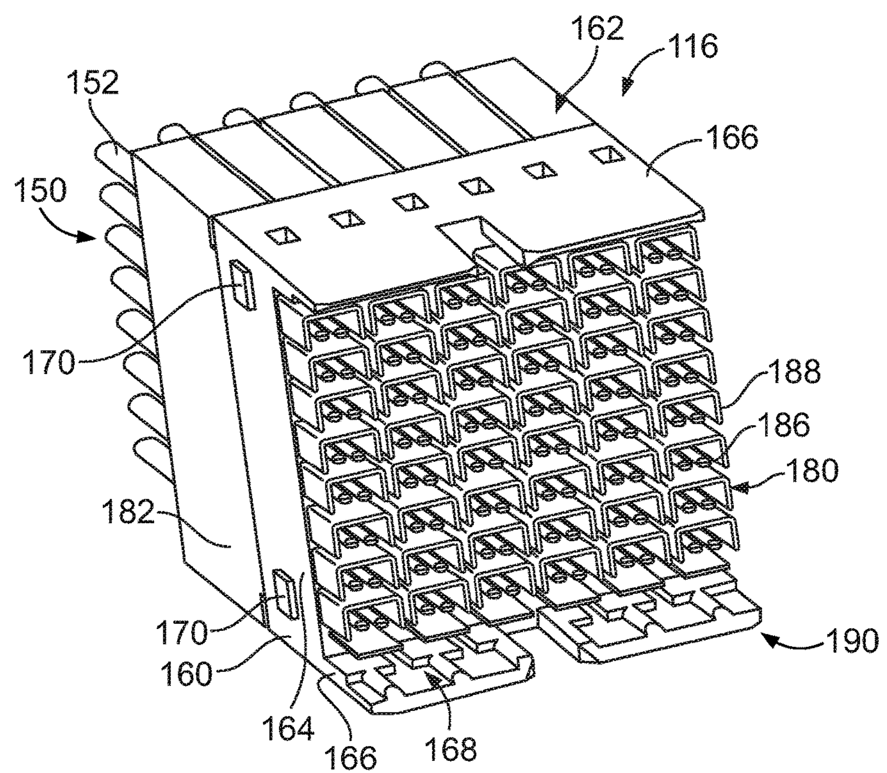
FIG. 2 illustrates a portion of a cable connector assembly of the cable communication system formed in accordance with an exemplary embodiment.

FIG. 2 illustrates a portion of one cable connector assembly 106 (FIG. 1) formed in accordance with an exemplary embodiment. The cable connector assembly 106 includes one or more cable connectors 116 (only one shown) and a cable bundle 150 connecting the one or more cable connectors 116. Optionally, cables 152 from one cable connector 116 may be routed to multiple, different cable connectors (not shown).

The cable connector 116 is provided at an end of the cable bundle 150. The cable bundle 150 includes a plurality of cables 152. The cables 152 extend to one or more different cable connectors (not shown) that are configured to be mated with different card connectors 104 of the same or different circuit cards 102.

Optionally, the cable connector 116 may define a header connector. The cable connector 116 is configured to be mated with a corresponding card connector 104, which may be a receptacle connector, such as STRADA Whisper receptacle connector, commercially available from TE Connectivity, Harrisburg, Pa.; however, the cable connector 116 may be a receptacle connector or another type of connector in alternative embodiments. In an exemplary embodiment, the cable connector 116 is a high speed differential pair cable connector that includes a plurality of differential pairs of conductors mated at a common mating interface. The differential conductors are shielded along the signal paths thereof to reduce noise, crosstalk and other interference along the signal paths of the differential pairs. Optionally, power conductors may be provided in lieu of or in addition to the signal conductors.

In an exemplary embodiment, the cables 152 are twin axial cables having two signal wires within a common jacket of the cable 152. The signal wires convey differential signals. In an exemplary embodiment, the signal wires are shielded, such as with a cable braid of the cable 152. Optionally, each of the signal wires may be individually shielded. Other types of cables 152 may be provided in alternative embodiments. For example, the cables 152 may be coaxial cables extending from the cable connector 116 each carrying a single signal conductor therein.

The cable connector 116 includes a header 160 holding one or more contact modules 162. The header 160 includes a base wall 164 and shroud walls 166 extending from the base wall 164 to define a mating cavity 168 configured to receive the corresponding card connector 104. The shroud walls 166 guide mating of the card connector 104 with the cable connector 116, such as to provide fine alignment with the card connector 104 during mating. In an exemplary embodiment, the header 160 has lugs 170 extending outward from the base wall 164 and/or the shroud walls 166. The lugs 170 are used to locate the cable connector 116 with respect to the connector frame 122 (shown in FIG. 1).

In an exemplary embodiment, the contact module 162 includes a plurality of cable assemblies 180 held by a support body 182. In the illustrated embodiment, a plurality of contact modules 162 are arranged with the support bodies 182 in a stacked configuration. Each cable assembly 180 includes a pair of signal contacts 186 terminated to corresponding signals wires of the cable 152. Each cable assembly 180 also includes a ground shield 188 providing shielding for the signal contacts 186. In an exemplary embodiment, the ground shield 188 peripherally surrounds the signal contacts 186 along the entire length of the signal contacts 186 to ensure that the signal paths are electrically shielded from interference. The cable assemblies 180 may be provided with greater or fewer signal contacts 186 in alternative embodiments. The cable assemblies 180 may be provided without the ground shields 188 in alternative embodiments. The cable assemblies 180 may be provided with different shaped ground shields 188 in alternative embodiments. The cable assemblies 180 may provide power in lieu of or in addition to the signals. The signal contacts 186 and ground shields 188 are configured to be mated to a corresponding card connector 104 (shown in FIG. 1) at a mating end 190 of the header 160. The signal contacts 186 and ground shields 188 may have other configurations in alternative embodiments. For example, the ground shields may be ground contacts (sized and shaped similar to the signal contacts 186) between the signal contacts 186 in various embodiments.

The support body 182 provides support for the cable assemblies 180. The cables 152 extend into the support body 182 such that the support body 182 supports a portion of the cables 152. The support body 182 may provide strain relief for the cables 152. Optionally, the support body 182 may be manufactured from a plastic material. Alternatively, the support body 182 may be manufactured from a metal material. The support body 182 may be a metalized plastic material to provide additional shielding for the cables 152 and the cable assemblies 180. Optionally, the support body 182 may include a metal plate electrically connected to each ground shield 188 to electrically common the ground shields 188, and a dielectric overmold overmolded around the cables 152 and portions of the metal plate to support the cables 152 and cable assemblies 180. The contact modules 162 may be provided without the support bodies 182 in alternative embodiments. In other various embodiments, the support body 182 may be integral with or defined by the header 160.

In an exemplary embodiment, multiple contact modules 162 are loaded into the header 160. The header 160 holds the contact modules 162 in parallel such that the cable assemblies 180 are aligned in parallel columns. Any number of contact modules 162 may be held by the header 160 depending on the particular application. When the contact modules 162 are stacked in the header 160, the cable assemblies 180 may also be aligned in rows. Other types of contact modules 162 and/or cable connectors 116 may be provided in alternative embodiments. Optionally, each contact module 162 may be connected to a different cable connector at the opposite end.

Figure 3:
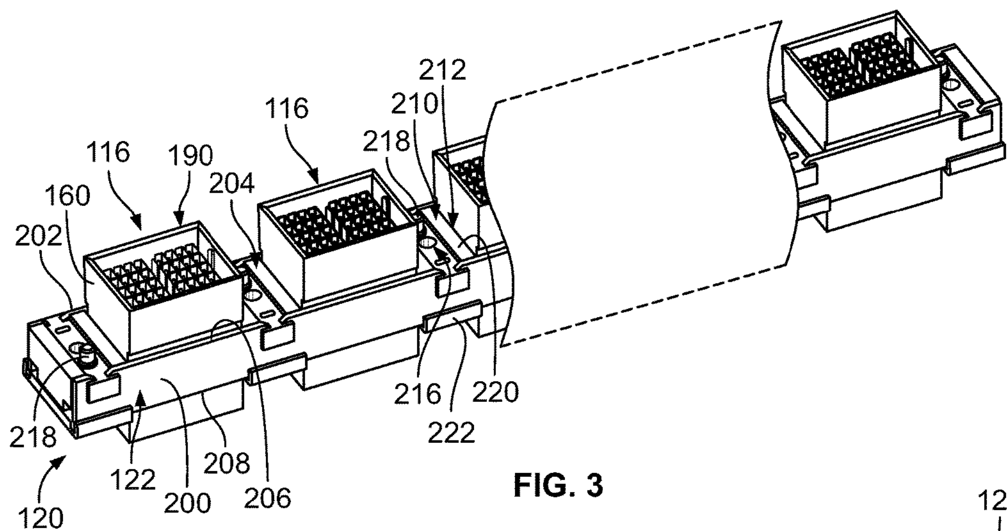
FIG. 3 is a front perspective view of a connector brick of the cable communication system formed in accordance with an exemplary embodiment.
Figure 4:
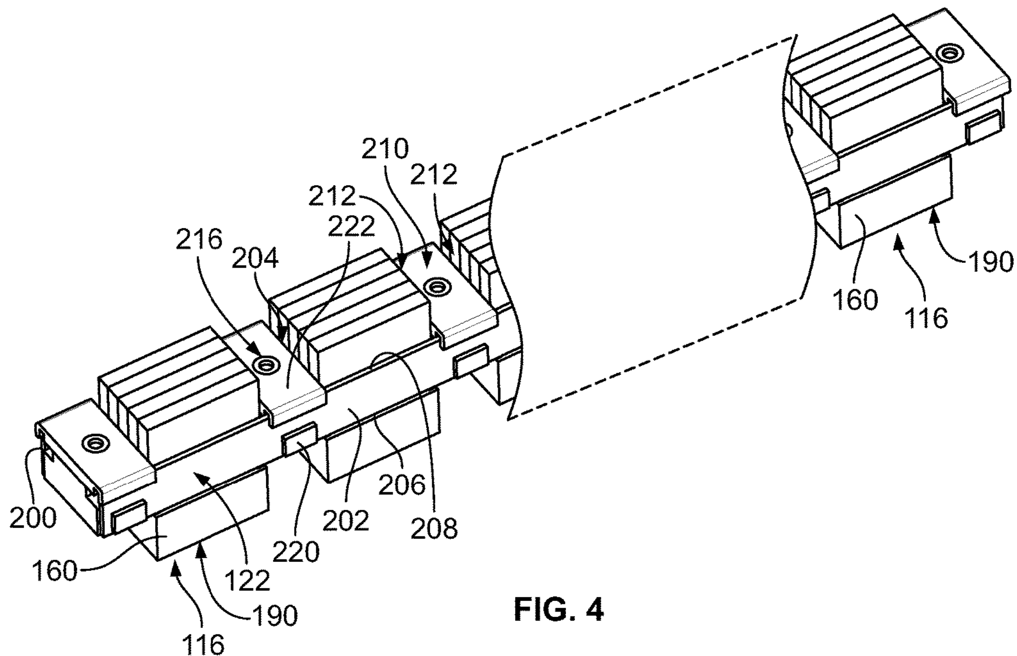
FIG. 4 is a rear perspective view of the connector brick formed in accordance with an exemplary embodiment.

FIG. 3 is a front perspective view of one of the connector bricks 120 formed in accordance with an exemplary embodiment. FIG. 4 is a rear perspective view of one of the connector bricks 120 formed in accordance with an exemplary embodiment. The connector brick 120 includes the connector frame 122 that holds the cable connectors 116. In the illustrated embodiment, the connector frame 122 includes first and second brick plates 200, 202. In the illustrated embodiment, the first and second brick plates 200, 202 are planar plates, such as sheet metal plates; however, other types of brick plates may be provided in alternative embodiments. Optionally, the first and second brick plates 200, 202 may be separate from each other; however, in alternative embodiments the first and second brick plates 200, 202 may be connected, such as by end plates at the ends of the first and second brick plates 200, 202. Optionally, the first brick plate 200 may be identical to the second brick plate 202. The first and second brick plates 200, 202 are separated from each other in parallel orientations defining a frame space 204 therebetween. In an exemplary embodiment, each of the first and second brick plates 200, 202 includes a front edge 206 and a rear edge 208. The front edge 206 is configured to face outward, such as toward the circuit card 102 (shown in FIG. 1). The rear edge 208 is configured to face toward the cables.

In an exemplary embodiment, the connector brick 120 includes cable connector mounts 210 extending between the first and second brick plates 200, 202 in the frame space 204. The cable connector mounts 210 are used for securing the cable connectors 116 in the frame space 204 between the connector frame 122. The cable connector mounts 210 may extend between the first and second brick plates 200, 202. Optionally, the cable connector mounts 210 are movably coupled to the first and second brick plates 200, 202, such as having a limited amount of floating movement relative to the first and second brick plates 200, 202.

The cable connector mounts 210 are used to position the cable connectors 116 in the connector frame 122 and to secure the cable connectors 116 in position for mating with corresponding card connectors 104 (shown in FIG. 1). The cable connector mounts 210 may be blocks positioned between the first and second brick plates 200, 202 to control the spacing between the brick plates 200, 202. The cable connector mounts 210 may be metal pieces, plastic pieces, or manufactured from other materials. Optionally, the cable connector mounts 210 may be multi-piece blocks, such as a front block and a rear block, which may be coupled together during assembly, such as to capture portions of the cable connectors 116 therebetween (for example, the lugs 170). Optionally, the cable connectors 116 may be rear loaded into the frame space 204 through the rear end and may be held in the connector frame 122 such that the mating ends 190 of the headers 160 are provided at or near the front end of the connector frame 122. The first and second brick plates 200, 202 may be secured to the cable connector mounts 210, such as by brackets and/or clips of the front and/or rear blocks, which may have an interference fit. Optionally, the first and second brick plates 200, 202 may be secured to the cable connector mounts 210 without the need for tools. The tool-less assembly allows quick assembly without the need for separate components, such as fasteners.

The frame space 204 is defined between the brick plates 200, 202 and extends longitudinally along the first and second brick plates 200, 202 (for example, in a longitudinal direction parallel to the first and second brick plates 200, 202). The cable connector mounts 210 sub-divide the frame space 204 into cable connector openings 212 configured to receive corresponding cable connectors 116. For example, the headers 160 of the cable connectors 116 are received in corresponding cable connector openings 212 in the frame space 204. Optionally, some of the cable connector openings 212 may be sized differently to receive different types of cable connectors 116. The frame space 204 may be sized to receive any number of headers 160, such as by lengthening or shortening the first and second brick plates 200, 202. Optionally, the connector frame 122 is sized to align the headers 160 in a single row within the frame space 204. For example, the cable connector mounts 210 control the spacing between the first and second brick plates 200, 202 to a single header width. Optionally, the cable connector mounts 210 may be positioned between each of the headers 160. For example, headers 160 are provided on both sides of various cable connector mounts 210 (for example, inner cable connector mounts). As such, the cable connector mounts 210 are used to support two headers 160. Optionally, some of the cable connector mounts 210 (for example, outer cable connector mounts) may be provided at the ends of the connector brick 120 and have headers 160 along only one side thereof.

With additional reference to FIG. 5, which is a perspective view of the first brick plate 200 (the second brick plate 202 may be similar or identical), the first brick plate 200 is a generally planar plate having a rectangular shape; however, other shapes are possible in alternative embodiments. The first brick plate 200 includes slots 214 at the front edge 206 that receive portions of the cable connector mounts 210. The cable connector mounts 210 may be positioned relative to each other along the first brick plate 200 by the slots 214. In various embodiments, the first brick plate 200 may include alignment slots configured to receive portions of the headers 160 to align the headers 160 with the connector frame 122. For example, the alignment slots may receive the lugs 170 (shown in FIG. 2) of the headers 160 and may be oversized relative to the lugs 170 to allow a controlled, limited amount of floating movement of the headers 160 relative to the connector frame 122. As such, when the connector bricks 120 are held in the frame 112 (shown in FIG. 1), the headers 160 are movable relative to the frame 112, such as for alignment with individual card connectors 104 (shown in FIG. 1). Alternatively, the lugs 170 may be received in the cable connector mounts 210 rather than in the brick plates 200, 202.

With reference back to FIGS. 3 and 4, the cable connector mounts 210 have securing features 216, which in the illustrated embodiment are openings, which are configured to receive guide pins (not shown) or fasteners (not shown) for securing the connector brick 120 to the chassis 110 and/or the organizer board and/or the circuit card 102. The cable connector mounts 210 have keying features 218, which in the illustrated embodiment are guide posts, configured to guide loading of the connector brick 120 with the chassis 110 and/or the organizer board and/or the circuit card 102. For example, the guide posts may extend into a corresponding opening in the chassis 110 and/or the organizer board and/or the circuit card 102 to locate the cable connector mount 210. Optionally, at least one of the keying features 218 are oriented differently than at least one other keying feature 218 to ensure that the connector brick 120 is properly oriented or keyed to the chassis 110 and/or the organizer board and/or the circuit card 102.

In an exemplary embodiment, the cable connector mount 210 includes a brick spacer 220 at the front end of the cable connector mount 210 and a retainer clip 222 at the rear end of the cable connector mount 210. The retainer clip 222 is snapably coupled to the brick spacer 220, such as without the need for a separate component therebetween. For example, the retainer clip 222 may be coupled to the brick spacer 220 without the need for a fastener or a separate tool to assembly the cable connector mount 210. The tool-less assembly allows quick assembly without the need for separate components, such as fasteners. When assembled, the brick spacer 220 is coupled to the first brick plate 200 and to the second brick plate 202 and engages corresponding cable connectors 116 to secure the cable connectors 116 in the frame space 204. In an exemplary embodiment, when assembled, the retainer clip 222 is coupled to the first brick plate 200 and to the second brick plate 202 and engages corresponding cable connectors 116 to secure the cable connectors 116 in the frame space 204.

FIG. 6 is a front perspective view of the retainer clip 222 in accordance with an exemplary embodiment. FIG. 7 is a rear perspective view of the retainer clip 222 in accordance with an exemplary embodiment. The retainer clip 222 includes an end plate 230 extending between a front 232 and a rear 234. The front 232 is configured to face the brick spacer 220 (shown in FIGS. 3 and 4).

In an exemplary embodiment, the retainer clip 222 includes an opening 236 that receives a threaded insert 238. In alternative embodiments, the opening 236 may be threaded rather than receiving the threaded insert 238. The threaded insert 238 is configured to be operably coupled to a fastener used to secure the cable connector mount 210 to the chassis 110 and/or the organizer board and/or the circuit card 102.

In an exemplary embodiment, the retainer clip 222 includes an alignment feature 240 used for aligning the retainer clip 222 to the brick spacer 220. In the illustrated embodiment, the alignment feature 240 is an alignment post extending from the front 232. Other types of alignment features may be used in alternative embodiments. In the illustrated embodiment, the opening 236 extends through the alignment feature 240; however, the alignment feature 240 may be at a different location or locations in alternative embodiments.

In an exemplary embodiment, the retainer clip 222 includes securing features 242 used for securing the retainer clip 222 to the brick spacer 220. In the illustrated embodiment, the securing features 242 include deflectable latches 244. Other types of securing features may be used in alternative embodiments. In the illustrated embodiment, the retainer clip 222 includes a pair of securing features 242; however, greater or fewer securing features 242 may be provided in alternative embodiments.

The end plate 230 extends between a first end 246 and a second end 248. The retainer clip 222 includes a first clip bracket 250 at the first end 246 and a second clip bracket 252 at the second end 248. The first and second clip brackets 250, 252 are used to secure the retainer clip 222 to the first and second brick plates 200, 202 (shown in FIGS. 3 and 4), respectively. In an exemplary embodiment, the first and second clip brackets 250, 252 are configured to engage the first and second brick plates 200, 202. In the illustrated embodiment, the first and second clip brackets 250, 252 include brick plate slots 254 that receive the corresponding first and second brick plates 200, 202. The first and second clip brackets 250, 252 include flanges 256 outside of the brick plate slots 254 that engage the corresponding first and second brick plates 200, 202. The first and second clip brackets 250, 252 may have other shapes and/or features in alternative embodiments for receiving and/or locating and/or securing to the corresponding first and second brick plates 200, 202.

Figure 8:
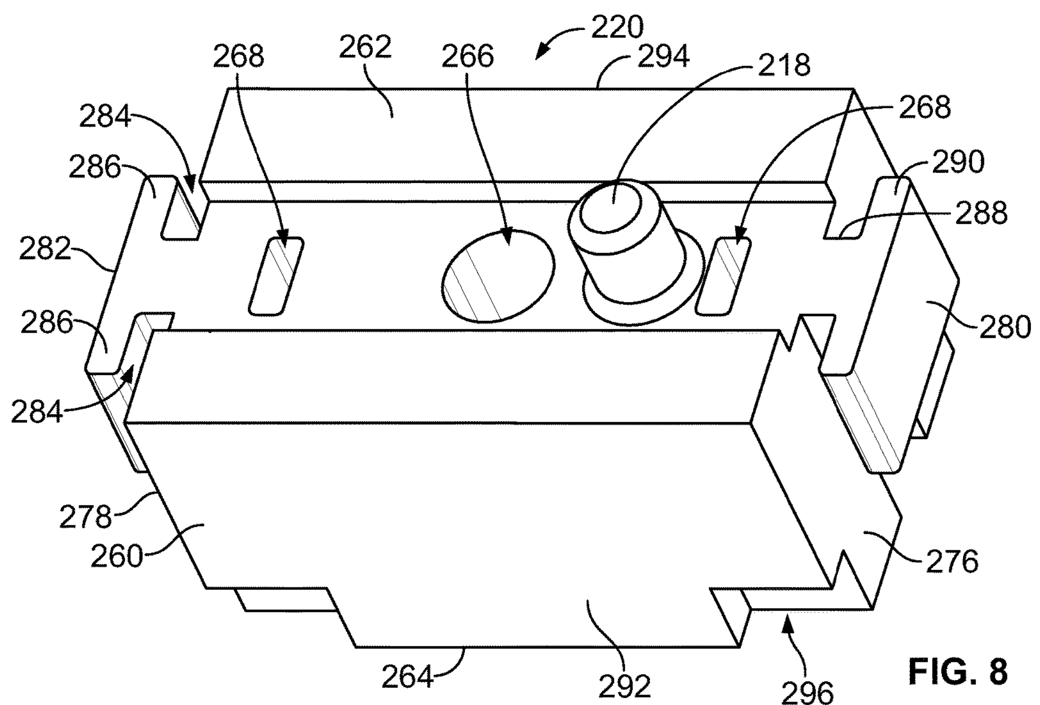
FIG. 8 is a front perspective view of a brick spacer of the connector brick in accordance with an exemplary embodiment.
Figure 9:
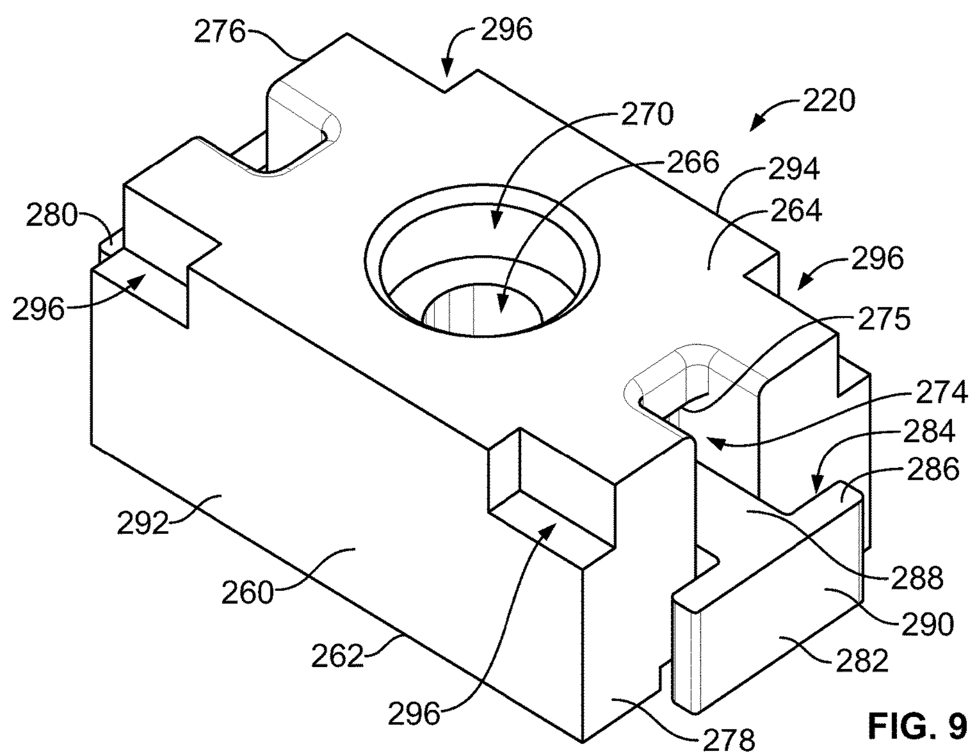
FIG. 9 is a rear perspective view of the brick spacer.
Figure 10:
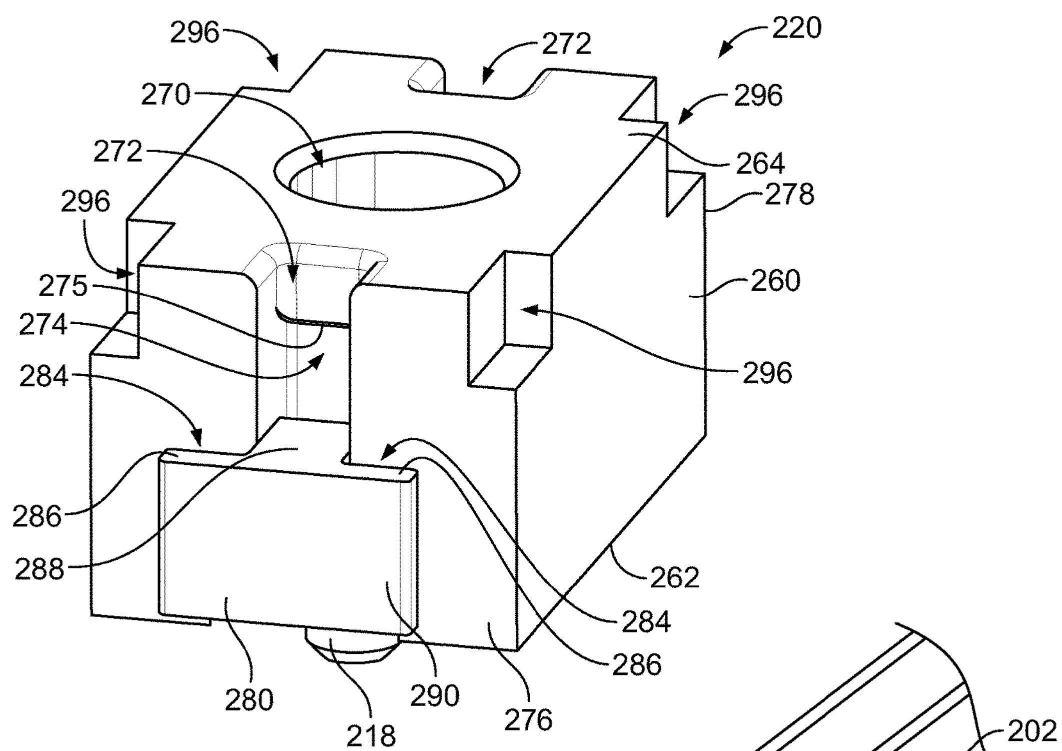
FIG. 10 is a side perspective view of the brick spacer.

FIG. 8 is a front perspective view of the brick spacer 220 in accordance with an exemplary embodiment. FIG. 9 is a rear perspective view of the brick spacer 220 in accordance with an exemplary embodiment. FIG. 10 is a side perspective view of the brick spacer 220 in accordance with an exemplary embodiment. The brick spacer 220 includes a main body 260 extending between a front 262 and a rear 264. The rear 264 is configured to face the retainer clip 222 (shown in FIGS. 6 and 7).

In an exemplary embodiment, the brick spacer 220 includes an opening 266 extending between the front 262 and the rear 264. The opening 266 is configured to receive a fastener used to secure the cable connector mount 210 to the chassis 110 and/or the organizer board and/or the circuit card 102. Optionally, the opening 266 may be approximately centered in the main body 260. In an exemplary embodiment, the brick spacer 220 includes release channels 268 (FIG. 8) at the front 262 on both sides of the opening 266. The release channels 268 are configured to receive a tool or other device for releasing the retainer clip 222 from the brick spacer 220. In the illustrated embodiment, the keying feature 218 extends from the front 262 proximate to the opening 266. In the illustrated embodiment, the keying feature 218 is provided on one side of the opening 266, such as between the opening 266 and one of the release channels 268. In the illustrated embodiment, the other side of the brick spacer 220 does not include a keying feature 218; however, the brick spacer 220 may include multiple keying features 218 in alternative embodiments, such as keying features 218 having different shapes to provide keyed mating with the chassis 110 and/or the organizer board and/or the circuit card 102.

In an exemplary embodiment, the brick spacer 220 includes an alignment feature 270 (FIGS. 9 and 10) used for aligning the retainer clip 222 to the brick spacer 220. The alignment feature 270 is configured to be operably coupled to the alignment feature 240 (shown in FIG. 6). For example, the alignment feature 270 may have a complementary shape to the alignment feature 240. In the illustrated embodiment, the alignment feature 270 is an alignment opening at the rear 264. The alignment opening receives the alignment post of the retainer clip 222. Other types of alignment features may be used in alternative embodiments. In the illustrated embodiment, the opening 266 extends through the alignment feature 270; however, the alignment feature 270 may be at a different location or locations in alternative embodiments.

In an exemplary embodiment, the brick spacer 220 includes securing features 272 (FIGS. 9 and 10) used for securing the retainer clip 222 to the brick spacer 220. The securing features 272 are configured to be operably coupled with the securing features 242 (shown in FIG. 6) of the retainer clip 222. In the illustrated embodiment, the securing features 272 include pockets 274 (FIGS. 9 and 10) that receive the deflectable latches 244 of the retainer clip 222. The securing features 272 include latching surfaces 275 (FIGS. 9 and 10) configured to be engaged by the latches 244. Other types of securing features may be used in alternative embodiments.

Figure 11:
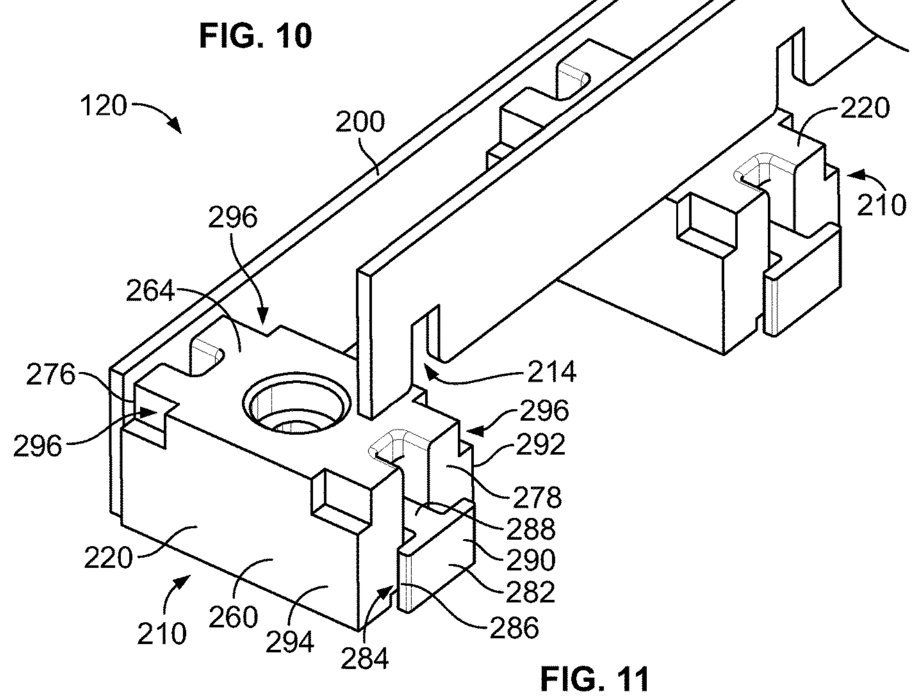
FIG. 11 is a rear perspective view of a portion of the connector brick.

With additional reference to FIG. 11, FIG. 11 is a rear perspective view of a portion of the connector brick 120 showing the first brick plate 200 coupled to a plurality of the cable connector mount 210 and showing the second brick plate 202 poised for coupling to the cable connector mounts 210. The main body 260 extends between a first end 276 and a second end 278. The brick spacer 220 includes a first spacer bracket 280 at the first end 276 and a second spacer bracket 282 at the second end 278. The first and second spacer brackets 280, 282 are used to secure the brick spacer 220 to the first and second brick plates 200, 202 (FIG. 11), respectively. In an exemplary embodiment, the first and second spacer brackets 280, 282 are configured to engage the first and second brick plates 200, 202. For example, the first and second spacer brackets 280, 282 are configured to be received in corresponding slots 214 (FIG. 11) of the first and second brick plates 200, 202.

In the illustrated embodiment, the first and second spacer brackets 280, 282 include brick plate slots 284 that receive the corresponding first and second brick plates 200, 202. The first and second spacer brackets 280, 282 include flanges 286 outside of the brick plate slots 284 that engage the corresponding first and second brick plates 200, 202. In an exemplary embodiment, the first and second spacer brackets 280, 282 are T-shaped posts having a base 288 extending from the corresponding first end 276 or second end 278 and a head 290 extending from the base 288. The head 290 defines the flanges 286. The brick plate slots 284 are defined between the head 290 and the corresponding first end 276 or second end 278. The first and second spacer brackets 280, 282 may have other shapes and/or features in alternative embodiments for receiving and/or locating and/or securing to the corresponding first and second brick plates 200, 202.

The main body 260 of the brick spacer 220 includes a first side 292 and a second side 294. The first side 292 is configured to face one of the cable connectors 116 (shown in FIG. 2) and the second side 294 is configured to face another of the cable connectors 116. The cable connectors 116 may abut against the first and second sides 292, 294. In an exemplary embodiment, the brick spacer 220 includes pockets 296 at the first side 292 and the second side 294 that receive portions of the cable connectors 116. For example, the pockets 296 are configured to receive the lugs 170 (shown in FIG. 2) extending from the headers 160 (shown in FIG. 2) of the cable connectors 116. In the illustrated embodiment, the pockets 296 are provided at the rear 264 and at the first end 276 and at the second end 278; however, the pockets 296 may be at other locations in alternative embodiments.

Figure 12:
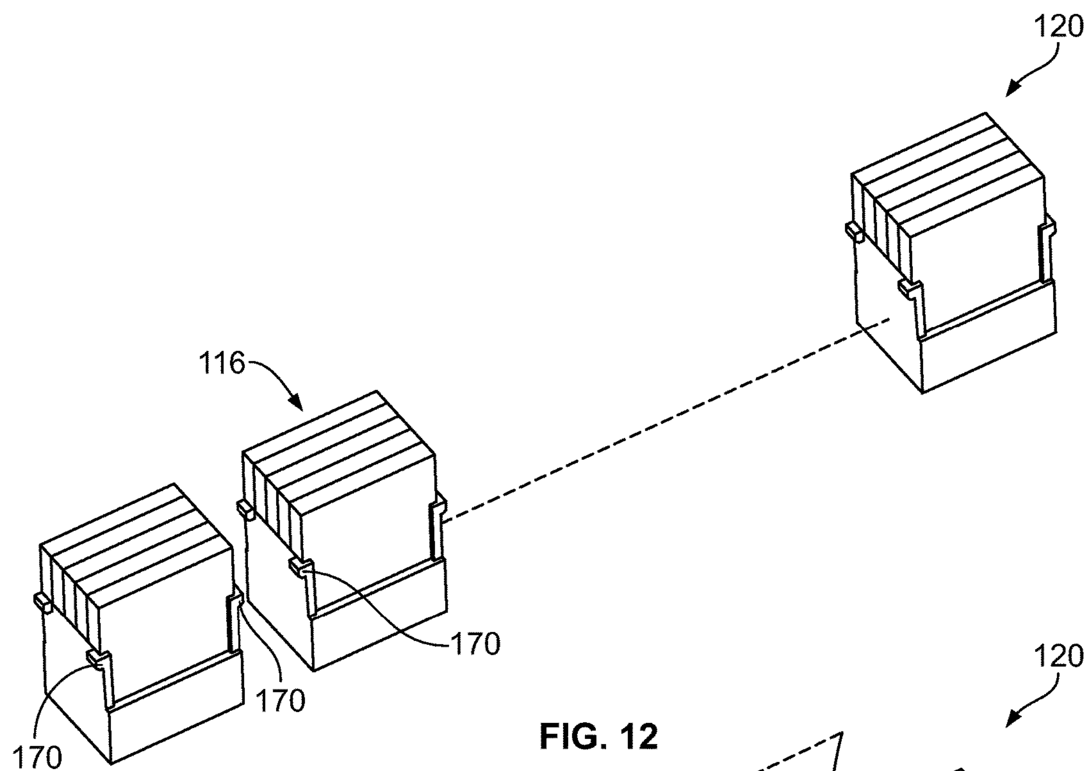
FIG. 12 illustrates a portion of the connector brick at a stage of assembly in accordance with an exemplary embodiment.
Figure 13:
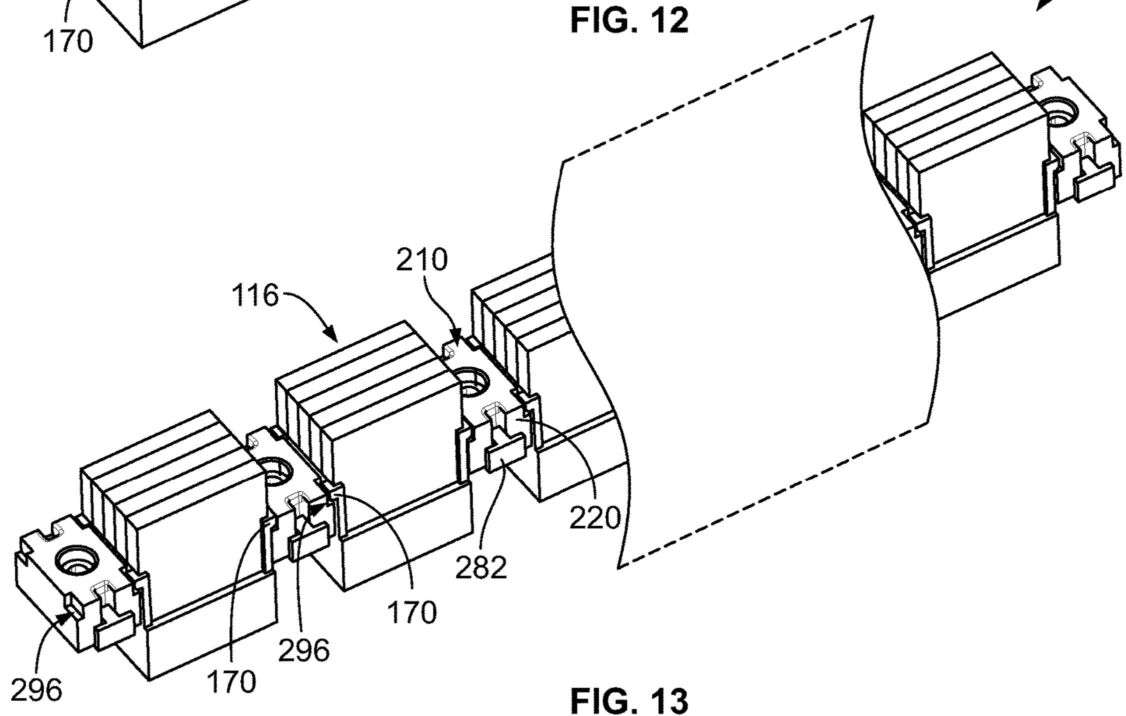
FIG. 13 illustrates a portion of the connector brick at a stage of assembly in accordance with an exemplary embodiment.

FIGS. 12-15 illustrate portions of the connector brick 120 at different stages of assembly in accordance with an exemplary embodiment; however, it is realized that the connector brick 120 may be assembled in a different manner than illustrated in FIGS. 12-15. In an exemplary embodiment, a plurality of the cable connectors 116 are provided, such as in a row as shown in FIG. 12. A plurality of the brick spacers 220 are provided and positioned relative to the cable connectors 116, such as between each of the cable connectors 116 and at the ends of the outermost cable connectors 116, as shown in FIG. 13. In an exemplary embodiment, the brick spacers 220 are positioned between the cable connectors 116 such that the lugs 170 are received in the pockets 296.

Figure 14:
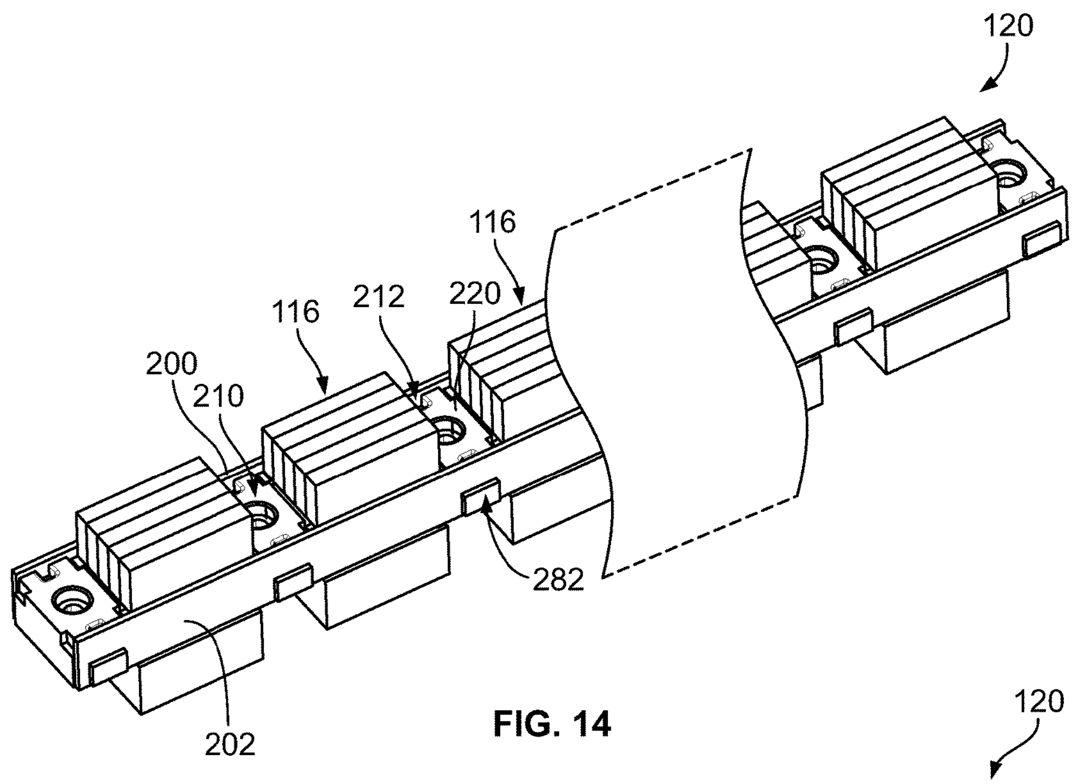
FIG. 14 illustrates a portion of the connector brick at a stage of assembly in accordance with an exemplary embodiment.

In an exemplary embodiment, the first and second brick plates 200, 202 are coupled to the corresponding brick spacers 220, such as shown in FIG. 14. For example, the first and second spacer brackets 280, 282 of each of the brick spacers 220 are received in the corresponding slots 214 (shown in FIG. 11). Optionally, the first and second brick plates 200, 202 may be coupled to each of the brick spacers 220 around the cable connectors 116 by loading the first and second brick plates 200, 202 on to the brick spacers 220. Alternatively, the brick spacers 220 may be coupled to the first and second brick plates 200, 202 by loading the brick spacers 220 on to the first and second brick plates 200, 202. In various embodiments, the cable connectors 116 may be preassembled with the brick spacers 220 prior to loading the first and second brick plates 200, 202 on to the assembly. In other various embodiments, the brick spacers 220 and the first and second brick plates 200, 202 may be preassembled and then the cable connectors 116 may be loaded into the assembly.

Figure 15:
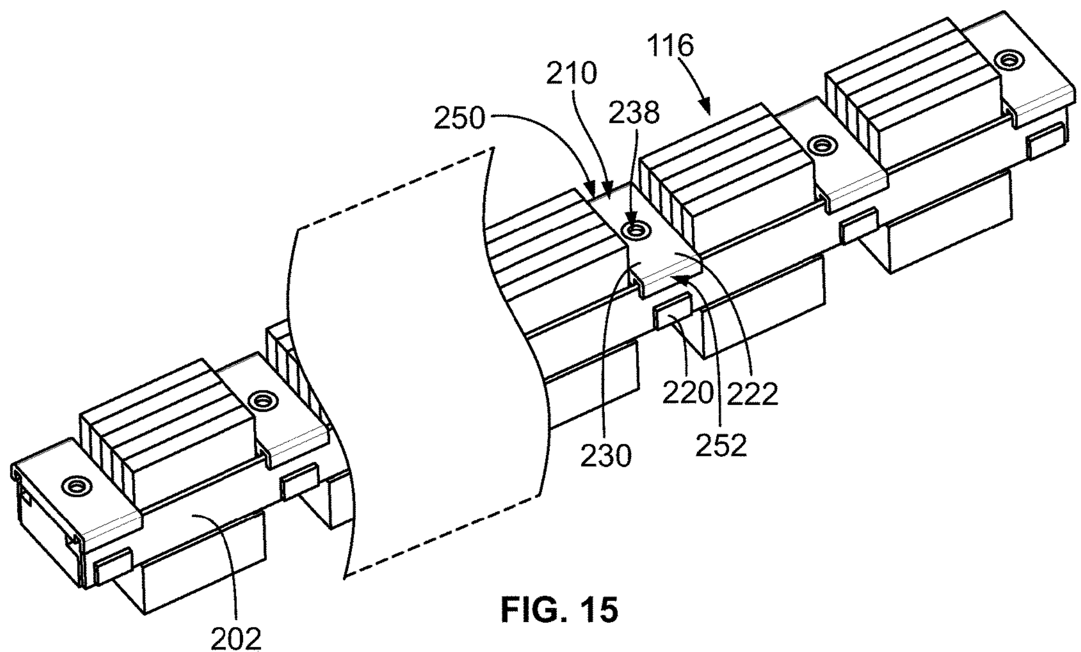
FIG. 15 illustrates a portion of the connector brick at a stage of assembly in accordance with an exemplary embodiment.

After the first and second brick plates 200, 202 are assembled with the brick spacers 220 and the cable connectors 116 are positioned in the corresponding cable connector openings 212, the retainer clips 222 are configured to be coupled to the brick spacers 220 and/or the first and second brick plates 200, 202 and/or the cable connectors 116, such as shown in FIG. 15. The securing features 242 (shown in FIG. 6) are snapably coupled to the securing features 272 (FIG. 14). Using the deflectable latches 244 allows the retainer clips 222 to be coupled to the brick spacers 220 and the brick plates 200, 202 without needing to access the exterior ends of the brick plates 200, 202. For example, the retainer clips 222 may be coupled to the brick spacers 220 and the brick plates 200, 202 after the connector bricks 120 are positioned in the frame 112 (shown in FIG. 4). The installer does not need to use fasteners through the brick plates 200, 202 to secure the retainer clips 222 to the brick plates 200, 202. The retainer clips 222 may be snapped into the brick spacers 220 quickly making overall assembly of the cable connector system 100 easier and less labor intensive. Using multi-piece cable connector mounts 210 provides easy assembly of the connector brick 120. For example, the cable connectors 116 may be loaded into the cable connector openings 212 in any order and at any time, including after the connector bricks 120 are mounted to the frame 112 (shown in FIG. 1).

When the retainer clips 222 are coupled to the brick spacers 220, the first and second clip brackets 250, 252 are coupled to the first and second brick plates 200, 202. The endplate 230 covers the pockets 296 and the lugs 170 (both shown in FIG. 14) to retain the cable connectors 116 and the cable connector openings 212. Optionally, the end plate 230 may include the pockets 274 or portions of the pockets 274 such that the retainer clip 222 receives at least portions of the lugs 170. In an exemplary embodiment, the pockets 274 may be slightly oversized to allow a limited amount of floating movement of the cable connectors 116 in the cable connector openings 212. For example, the cable connectors 116 may be able to slightly shift or float longitudinally and/or laterally within the cable connector openings 212.

When assembled, the retainer clips 222 capture the cable connectors 116 in the cable connector openings 212. The retainer clips 222 block pullout of the cable connectors 116 from the cable connector openings 212. In an exemplary embodiment, the retainer clips 222 may be positioned relative to the lugs 170 to allow a limited amount of floating movement of the cable connectors 116 in the cable connector openings 212. For example, the cable connectors 116 may be able to slightly shift or float in a front-to-rear direction within the cable connector openings 212. The retainer clips 222 may allow a limited amount of floating movement of the cable connector mounts 210 on the first and second brick plates 200, 202 for aligning the cable connectors 116 in the cable connector openings 212. The assembled connector brick 120 may be coupled to the chassis 110 and/or the organizer board and/or the circuit card 102, such as using fasteners that pass through the brick spacers 220 and the retainer clips 222 for threadably coupling to the threaded inserts 238.

Figure 16:
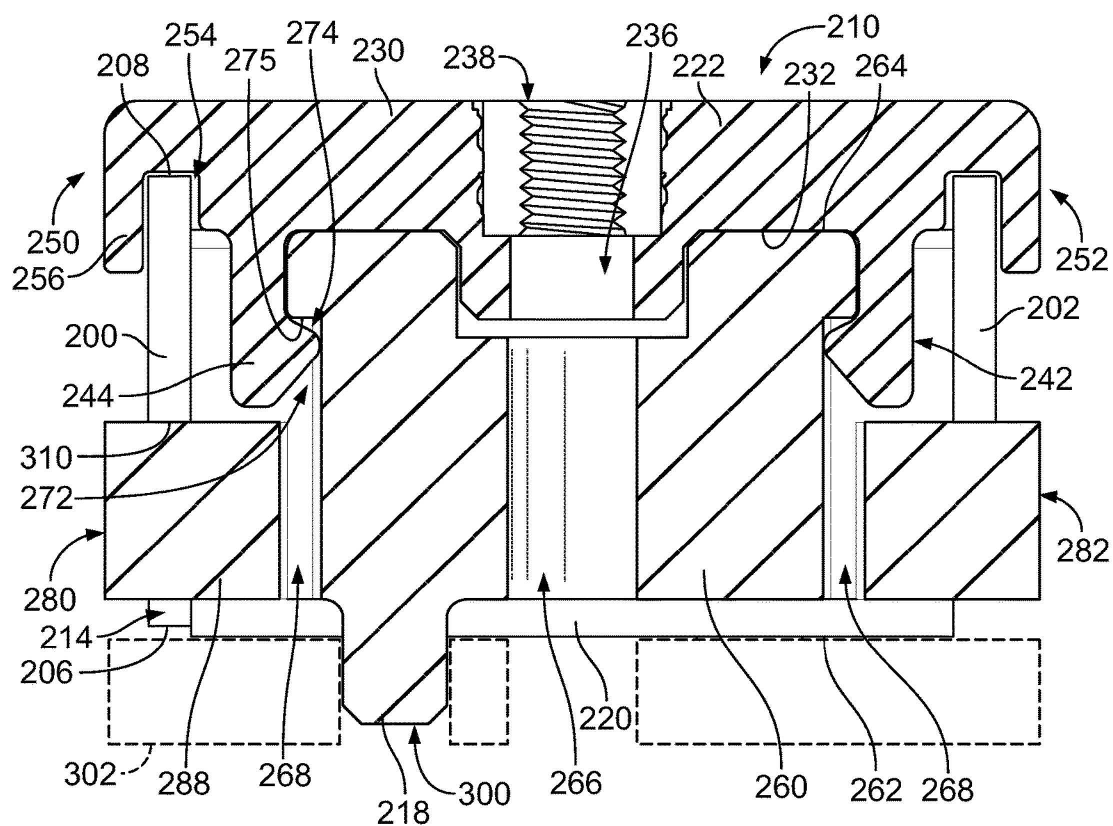
FIG. 16 is a cross-sectional view a cable connector mount of the connector brick in accordance with an exemplary embodiment.
Figure 17:
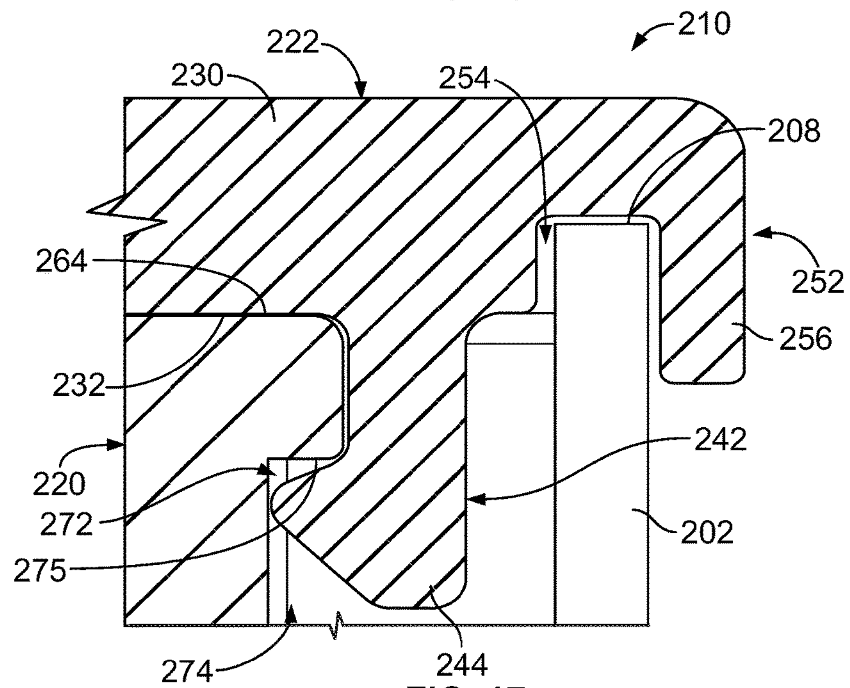
FIG. 17 is an enlarged, cross-sectional view of a portion of the cable connector mount.

FIG. 16 is a cross-sectional view of one of the cable connector mounts 210 in an assembled state and coupled to the first and second brick plates 200, 202. FIG. 17 is an enlarged, cross-sectional view of a portion of the cable connector mounts 210 showing a portion of the retainer clip 222 coupled to the brick spacer 220 and the second brick plate 202. When assembled, the retainer clip 222 is a snapably coupled to the brick spacer 220. The front 232 of the endplate 230 abuts against the rear 264 of the main body 260. The deflectable latches 244 of the securing features 242 are received in the pockets 274 of the securing features 272 and engage the latching surfaces 275. The release channels 268 are aligned with the pockets 274 to allow a release tool to release the deflectable latches 244 from the latching surfaces 275 to uncouple the retainer clip 222 from the brick spacer 220.

When assembled, the opening 236 and the threaded insert 238 are aligned with the opening 266 for receiving the threaded fastener for securing the connector brick 120 to, for example, the chassis 110 and/or the organizer board and/or the circuit card 102. For example, as shown in FIG. 16, the keying features 218 at the front 262 of the brick spacer 220 may be received in an opening 300 in an organizer board 302 for locating the connector brick 120 relative to the organizer board 302. A fastener (not shown) may pass through the organizer board 302 into the opening 266, the opening 236 and engage the threaded insert 238 to secure the cable connector mounts 210 to the organizer board 302.

When assembled, the brick spacer 220 is coupled to the first and second brick plates 200, 202 using the first and second spacer brackets 280, 282. For example, the first and second spacer brackets 280, 282 are loaded into the slots 214 through the corresponding front edges 206. The bases 288 may abut against bottoms 310 of the slots 214. The first and second brick plates 200, 202 are received in the corresponding brick plate slots 284 (shown in FIG. 11). Optionally, the brick plate slots 284 may be slightly oversized relative to the first and second brick plates 200, 202 to allow a limited amount of floating movement of the cable connector mount 210 relative to the first and second brick plates 200, 202.

When assembled, the retainer clip 222 extends over the rear edges 208 of the first and second brick plates 200, 202. For example, the first and second clip brackets 250, 252 are coupled to the first and second brick plates 200, 202. The brick plate slots 254 receive the rear edges 208 of the first and second brick plates 200, 202. The flanges 256 extend along the outer sides of the first and second brick plates 200, 202. Optionally, the brick plate slots 254 may be slightly oversized relative to the first and second brick plates 200, 202 to allow a limited amount of floating movement of the cable connector mount 210 relative to the first and second brick plates 200, 202.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A connector brick for a cable communication system comprising:

a connector frame including first and second brick plates defining a frame space;

cable connectors received in the frame space, each cable connector having cables extending therefrom, each cable connector having a header holding signal contacts at a mating end of the header and configured for mating with a corresponding card connector of a circuit card; and cable connector mounts coupled to the first and second brick plates and extending across the frame space, the cable connector mounts sub-dividing the frame space into cable connector openings receiving corresponding cable connectors, each cable connector mount including a brick spacer coupled to the first brick plate and the second brick plate and engaging corresponding cable connectors to secure the cable connectors in the frame space, each cable connector mount including a retainer clip having deflectable latches snapably coupled to the brick spacer to secure the brick spacer to the first brick plate and to the second brick plate.

2. The connector brick of claim 1, wherein the cable connectors are movable relative to the corresponding brick spacers, the brick spacers allowing a limited amount of floating movement of the cable connectors in the frame space for alignment with the corresponding card connectors during mating.

3. The connector brick of claim 1, wherein the cable connector mounts are loosely coupled to the first and second brick plates to allow a limited amount of floating movement of the cable connector mounts and the cable connectors in the frame space for alignment with the corresponding card connectors during mating.

4. The connector brick of claim 1, wherein the cable connector mounts are interspersed between successive cable connectors such that at least one of the brick spacers secure two cable connectors in the frame space with one cable connector on a first side of the brick spacer and another cable connector on an opposite second side of the brick spacer.

5. The connector brick of claim 1, wherein headers are captured between the brick spacers and the corresponding retainer clips with the retainer clips engaging the corresponding cable connectors to secure the cable connectors in the frame space.

6. The connector brick of claim 1, wherein the brick spacers include pockets and the retainer clips cover the pockets, the headers including lugs extending therefrom being received in corresponding pockets to capture the headers between the brick spacers and the retainer clips.

7. The connector brick of claim 1, wherein the deflectable latches are releasably coupled to latching features of the brick spacers to secure the retainer clips to the brick spacers, the deflectable latches being movable between a latched position and an unlatched position.

8. The connector brick of claim 1, wherein each brick spacer has first and second spacer brackets coupled to the first and second brick plates, respectively, and wherein each retainer clip has first and second clip brackets coupled to the first and second brick plates, respectively, such that the first brick plate is captured between the corresponding first spacer brackets and the first clip brackets and such that the second brick plate is captured between the corresponding second spacer brackets and the second clip brackets.

9. The connector brick of claim 1, wherein the first and second brick plates have slots open at front edges of the first and second brick plates, each brick spacer has first and second spacer brackets received in corresponding slots in the first and second brick plates, respectively.

10. The connector brick of claim 9, wherein each retainer clip has first and second clip brackets coupled to rear edges of the first and second brick plates, respectively, to secure the first and second brick plates between the retainer clips and the crick spacers.

11. The connector brick of claim 1, wherein each brick spacer includes an alignment hole and each retainer clip includes an alignment post received in the corresponding alignment hole to locate the retainer clip relative to the brick spacer.

12. The connector brick of claim 1, wherein each brick spacer includes a keying post extending from a front of the brick spacer, the keying post configured to be received in a locating opening in a panel of the cable communication system, wherein at least one of the keying posts has a different orientation than at least one other keying post for orienting the connector brick relative to the panel.

13. A connector brick for a cable communication system comprising:

a connector frame including first and second brick plates defining a frame space;

cable connectors received in the frame space, each cable connector having cables extending therefrom, each cable connector having a header holding signal contacts at a mating end of the header and configured for mating with a corresponding card connector of a circuit card; and cable connector mounts coupled to the first and second brick plates and extending across the frame space, the cable connector mounts sub-dividing the frame space into cable connector openings receiving corresponding cable connectors, each cable connector mount including a brick spacer having first and second spacer brackets coupled to the first and second brick plates, respectively, and each cable connector mount including a retainer clip having first and second clip brackets coupled to the first and second brick plates, respectively, such that the first brick plate is captured between the corresponding first spacer brackets and the first clip brackets and such that the second brick plate is captured between the corresponding second spacer brackets and the second clip brackets, the brick spacers engaging corresponding cable connectors to secure the cable connectors in the frame space, the retainer clips being securely coupled to the corresponding brick plates.

14. The connector brick of claim 13, wherein the cable connectors are movable relative to the corresponding brick spacers, the brick spacers allowing a limited amount of floating movement of the cable connectors in the frame space for alignment with the corresponding card connectors during mating.

15. The connector brick of claim 13, wherein the cable connector mounts are loosely coupled to the first and second brick plates to allow a limited amount of floating movement of the cable connector mounts and the cable connectors in the frame space for alignment with the corresponding card connectors during mating.

16. The connector brick of claim 13, wherein the cable connector mounts are interspersed between successive cable connectors such that at least one of the brick spacers secure two cable connectors in the frame space with one cable connector on a first side of the brick spacer and another cable connector on an opposite second side of the brick spacer.

17. The connector brick of claim 13, wherein headers are captured between the brick spacers and the corresponding retainer clips with the retainer clips engaging the corresponding cable connectors to secure the cable connectors in the frame space.

18. The connector brick of claim 13, wherein the brick spacers include pockets and the retainer clips cover the pockets, the headers including lugs extending therefrom being received in corresponding pockets to capture the headers between the brick spacers and the retainer clips.

19. The connector brick of claim 13, wherein the retainer clips include latches snapably coupled to latching features of the brick spacers to secure the retainer clips to the brick spacers.

20. A cable communication system comprising:

a chassis having a frame having a plurality of frame members; and connector bricks coupled to the frame, each connector brick comprising:

a connector frame including first and second brick plates defining a frame space;

cable connectors received in the frame space, each cable connector having cables extending therefrom, each cable connector having a header holding signal contacts at a mating end of the header and configured for mating with a corresponding card connector of a circuit card; and cable connector mounts coupled to the first and second brick plates and extending across the frame space, the cable connector mounts sub-dividing the frame space into cable connector openings receiving corresponding cable connectors, each cable connector mount including a brick spacer coupled to the first brick plate and the second brick plate and engaging corresponding cable connectors to secure the cable connectors in the frame space, each cable connector mount including a retainer clip having deflectable latches snapably coupled to the brick spacer to secure the brick spacer to the first brick plate and to the second brick plate.

* * * * *